US009969167B2

(12) United States Patent
Amma et al.

(10) Patent No.: US 9,969,167 B2
(45) Date of Patent: May 15, 2018

(54) LIQUID EJECTION HEAD AND METHOD FOR MANUFACTURING THE SAME

(71) Applicant: CANON KABUSHIKI KAISHA, Tokyo (JP)

(72) Inventors: Hiromasa Amma, Kawasaki (JP); Mikiya Umeyama, Tokyo (JP); Genji Inada, Koshigaya (JP); Takuya Iwano, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/076,476

(22) Filed: Mar. 21, 2016

(65) Prior Publication Data
US 2016/0279937 A1 Sep. 29, 2016

(30) Foreign Application Priority Data

Mar. 23, 2015 (JP) .................................. 2015-059442

(51) Int. Cl.
*B41J 2/14* (2006.01)
*B41J 2/16* (2006.01)
*B41J 2/175* (2006.01)
*B29C 45/33* (2006.01)

(52) U.S. Cl.
CPC ......... *B41J 2/1637* (2013.01); *B41J 2/14145* (2013.01); *B41J 2/17513* (2013.01); *B41J 2/17553* (2013.01); *B29C 45/33* (2013.01); *B41J 2002/14419* (2013.01)

(58) Field of Classification Search
CPC ..... B29C 33/0033; B29C 33/76; B29C 33/48; B29C 33/485; B29C 33/50; B29C 33/505; B29C 45/00; B29C 2045/175; B29C 2014/1784; B29C 45/26; B29C 45/2624; B29C 45/2628; B29C 45/5675; B29C 2045/334; B29C 2045/363; B29C 2045/366

See application file for complete search history.

(56) References Cited

U.S. PATENT DOCUMENTS

| 4,134,243 | A | * | 1/1979 | Fries | ................... | B28B 11/0827 |
| | | | | | | 428/116 |
| 2009/0261493 | A1 | * | 10/2009 | Winget | ............... | B29C 45/0053 |
| | | | | | | 264/39 |
| 2013/0002768 | A1 | | 1/2013 | Miyazawa | | |

FOREIGN PATENT DOCUMENTS

| CN | 1374196 A | 10/2002 |
| CN | 1460593 A | 12/2003 |
| CN | 101422985 A | 5/2009 |
| CN | 101549585 A | 10/2009 |
| CN | 102233733 A | 11/2011 |

(Continued)

*Primary Examiner* — Matthew J Daniels
*Assistant Examiner* — Mohammad M Ameen
(74) *Attorney, Agent, or Firm* — Canon U.S.A., Inc. IP Division

(57) ABSTRACT

A liquid ejection head has a plurality of ejection ports for ejecting a liquid, and a housing provided with a pair of liquid chambers which supply the liquid to a corresponding ejection port. A method for manufacturing the liquid ejection head includes: arranging a pair of mold pieces, of which width decreases gradually, to adjoin in the width direction thereof with the width decreasing in the opposite directions, molding a housing, and forming the pair of liquid chambers by drawing the pair of mold pieces from the molded housing in the direction in which the width increases.

4 Claims, 14 Drawing Sheets

(56) References Cited

FOREIGN PATENT DOCUMENTS

| CN | 104108241 A | 10/2014 |
|---|---|---|
| JP | 3801003 B2 | 7/2006 |

* cited by examiner

LIQUID EJECTION HEAD AND METHOD FOR MANUFACTURING THE SAME

BACKGROUND OF THE INVENTION

Field of the Invention

The present invention relates to a method for manufacturing a liquid ejection head mounted on a liquid ejection apparatus, and a configuration of a liquid ejection head.

Description of the Related Art

An ordinary liquid ejection apparatus is provided with a liquid ejection head mounted on a carriage, a carriage driving means, a recording medium conveying means, and a control means for controlling these components. A recording operation conducted while moving the carriage is referred to as a serial scanning method. Japanese Patent No 3801003 discloses a serial scanning liquid ejection head. The disclosed liquid ejection head has a housing provided with a liquid chamber which supplies a liquid to ejection ports. The liquid ejection head has six liquid chambers adjoining in a scanning direction, and a plurality of ejection ports each corresponding to each of the liquid chambers.

To increase a recording rate of serial scanning liquid ejection head, it is effective to increase the number of ejection ports (a length of an ejection port array) in a direction to cross a scanning direction of the liquid ejection head (hereafter, "cross direction"). This can increase a recordable width in the cross direction in one scanning event.

In a liquid ejection head, a recovery operation for removing a thickened matter or accumulated air bubbles in the liquid, such as ink, in the liquid ejection head, is usually conducted to maintain high recording quality. To discharge the thickened matter or the accumulated air bubbles reliably, the liquid contained in the liquid chambers is also discharged. As the number of ejection ports increases, an amount of liquid to be discharged also increases. Therefore, the volume of the liquid chambers needs to be increased to reduce the frequency at which the recovery operation is conducted. As the number of ejection ports increases, air bubbles generated during the recording operation also increases inevitably. Since the air bubbles are partially accumulated in the liquid chambers, the volume of the liquid chambers needs to be increased to accommodate the air bubbles in the liquid chambers.

Regarding a housing of the liquid ejection head, to reduce cost and to form a channel toward the printing element board, a plurality of liquid chambers are usually formed with their widths in the scanning direction decreasing toward the ejection ports. The liquid chambers, as described above, desirably have a greater volume to contain the liquid and to accumulate air bubbles. Therefore, the liquid chambers tend to be elongated in shape in the cross direction. This enables the air bubbles generated near the ejection ports to be moved smoothly to the liquid chambers.

The housing constituting the liquid chamber is usually manufactured by molding. In the liquid ejection head disclosed in Japanese Patent No. 3801003, to form the liquid chambers, six mold pieces to be drawn in the same direction are used. The mold piece has a draft from the viewpoint of releasability during molding. Specifically, the width of the mold piece in the scanning direction decreases gradually toward an end portion from a base portion, and the mold piece is drawn from the base portion after molding. Partition walls between the liquid chambers adjoining in the scanning direction are formed by gaps of the mold pieces. However, with the draft, the thickness of the partition wall in the scanning direction becomes greater at the end portion of the mold piece and becomes smaller at the base portion, whereby becomes uneven in the cross direction. Since the liquid chambers tend to be elongated in the cross direction as described above, the mold pieces are elongated and unevenness in the thickness of the partition walls in the cross direction becomes more significant. In molding, if the width of the product wall is uneven, problems like sink and short circuit may easily occur.

SUMMARY OF THE INVENTION

The present invention provides a method for manufacturing a liquid ejection head which has a plurality of ejection ports for ejecting a liquid, and a housing provided with a pair of liquid chambers which supply the liquid to a corresponding ejection port. The method includes: arranging a pair of mold pieces, of which width decreases gradually, to adjoin in the width direction thereof with the width decreasing in the opposite directions, molding a housing, and forming the pair of liquid chambers by drawing the pair of mold pieces from the molded housing in the direction in which the width increases.

The liquid ejection head of the present invention includes a plurality of ejection ports for ejecting a liquid, and a pair of liquid chambers for supplying the liquid to corresponding ejection port, wherein the liquid chambers each have a with decreasing gradually, and the liquid chambers adjoin in the width direction thereof with the width decreasing in the opposite directions.

Further features of the present invention will become apparent from the following description of exemplary embodiments with reference to the attached drawings.

DESCRIPTION OF THE EMBODIMENTS

Hereinafter, embodiments of the present invention are described with reference to the drawings. The following embodiments are described with reference to an inkjet head that ejects ink at a recording medium, but the invention is not limited to the same, the invention is applicable widely to liquid ejection heads that eject liquids.

First Embodiment

Figure 1:
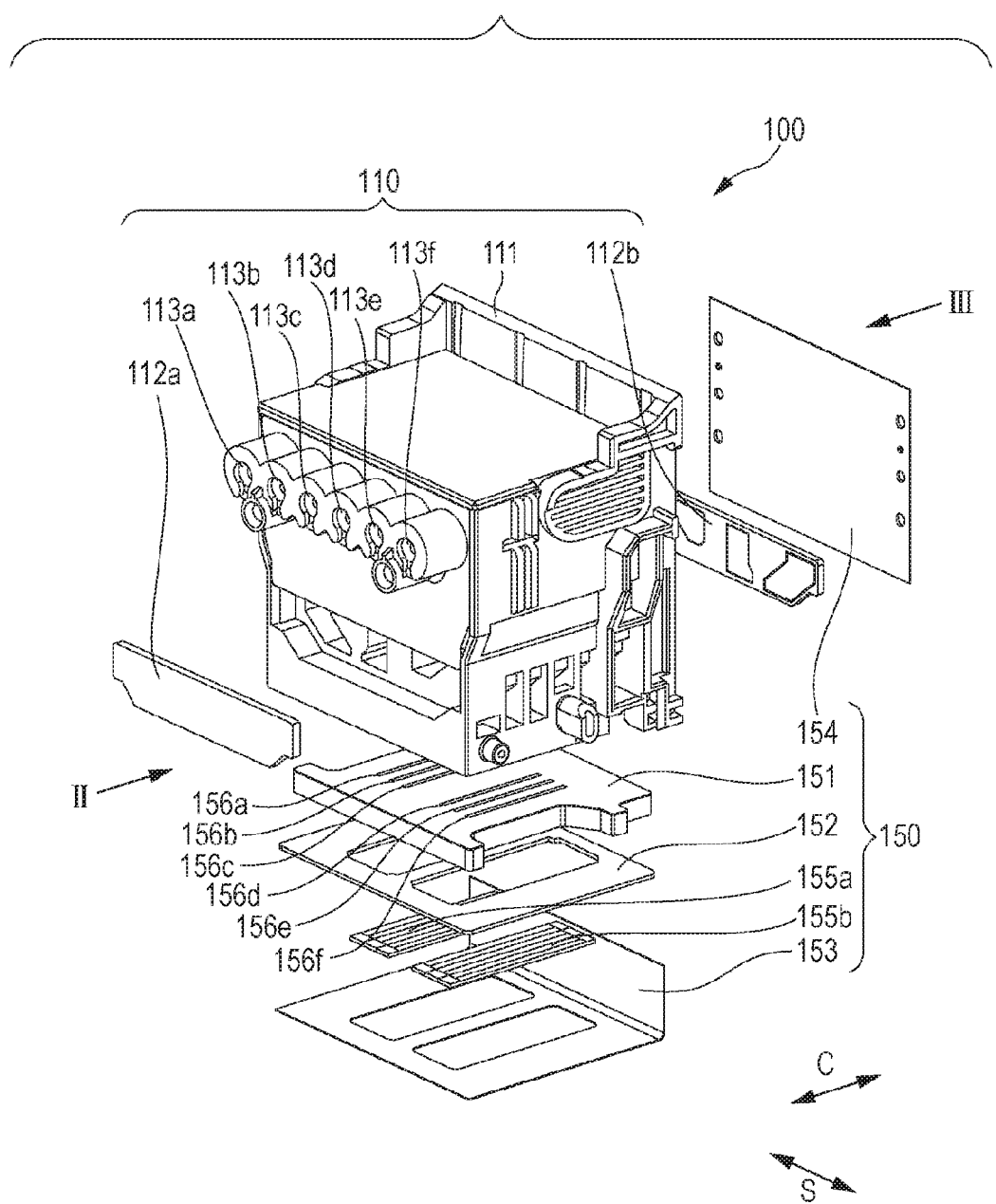
FIG. 1 is an exploded perspective view of a liquid ejection head in a first embodiment of the present invention.
Figure 2:
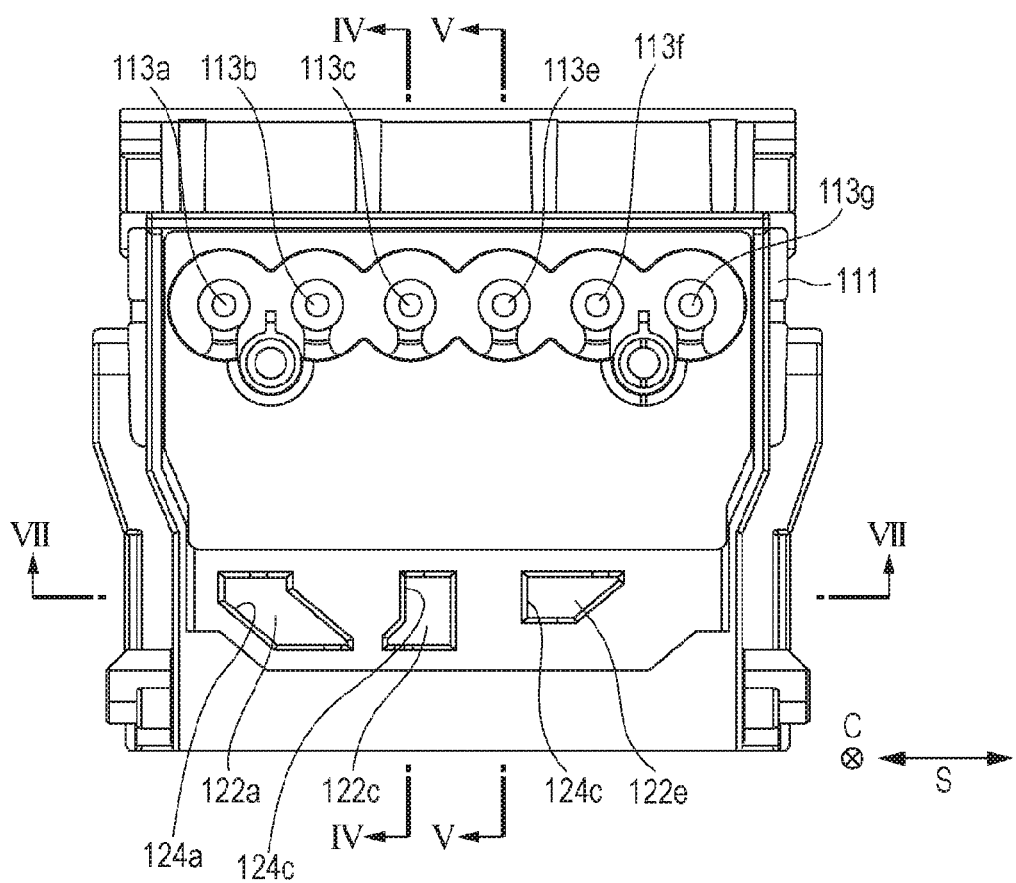
FIG. 2 is a plan view of the liquid ejection head in the first embodiment of the present invention.
Figure 3:
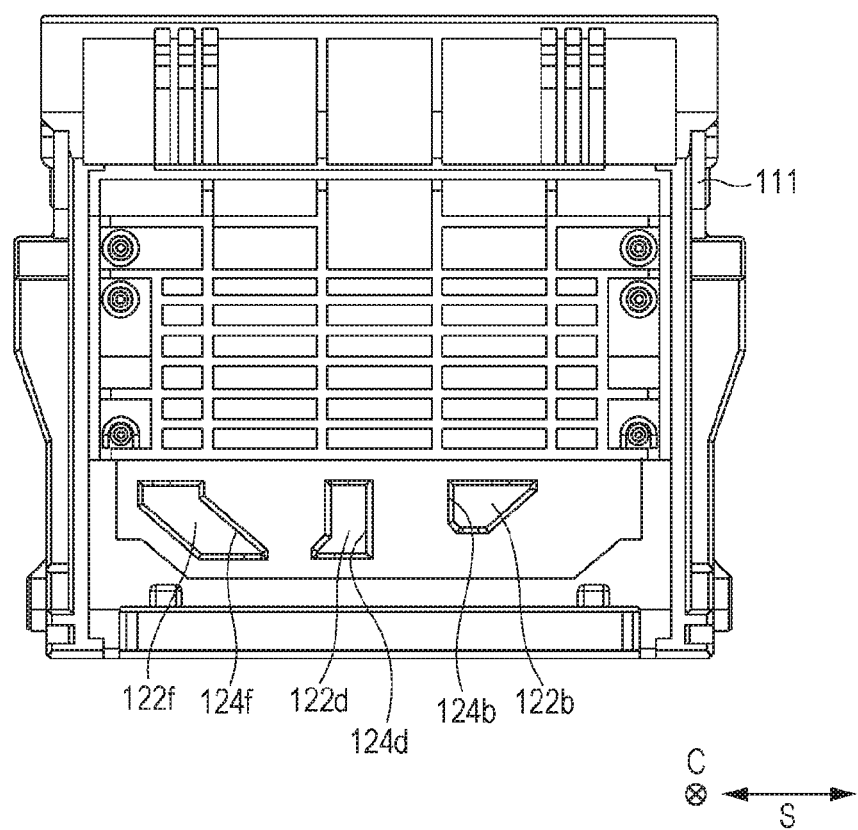
FIG. 3 is a plan view of the liquid ejection head in the first embodiment of the present invention.

FIG. 1 is an exploded perspective view illustrating a liquid ejection head 100 of a first embodiment. FIG. 2 is a plan view of the liquid ejection head 100 seen from the direction of arrow II of FIG. 1 with a lid member 112a being removed. FIG. 3 is a plan view of the liquid ejection head 100 seen from the direction of arrow III of FIG. 1 with a lid member 112b being removed.

The liquid ejection head 100 is constituted by an ink supply unit 110 and a recording element unit 150 which ejects in at a recording medium when ink as a recording liquid is supplied from the ink supply unit 110. The liquid ejection head 100 is fixedly supported by a carriage by a positioning means at an electric contact of the carriage provided in a liquid ejection apparatus (not illustrated). The liquid ejection head 100 is detachably attached to the carriage.

The liquid ejection apparatus is provided with an ink supply tube (not illustrated) connected to an ink tank (not illustrated). A liquid connector is provided at an end of the ink supply tube. When the liquid ejection head 100 is mounted, the liquid connector and a liquid connector insertion opening are connected airtight and ink in the ink tank is supplied to the liquid ejection head. The present embodiment is a liquid ejection head in which six types of ink can be mounted. Liquid connector insertion openings 113a to 113f are provided each corresponding to each ink supply tube to form individual supply path.

Figure 4:
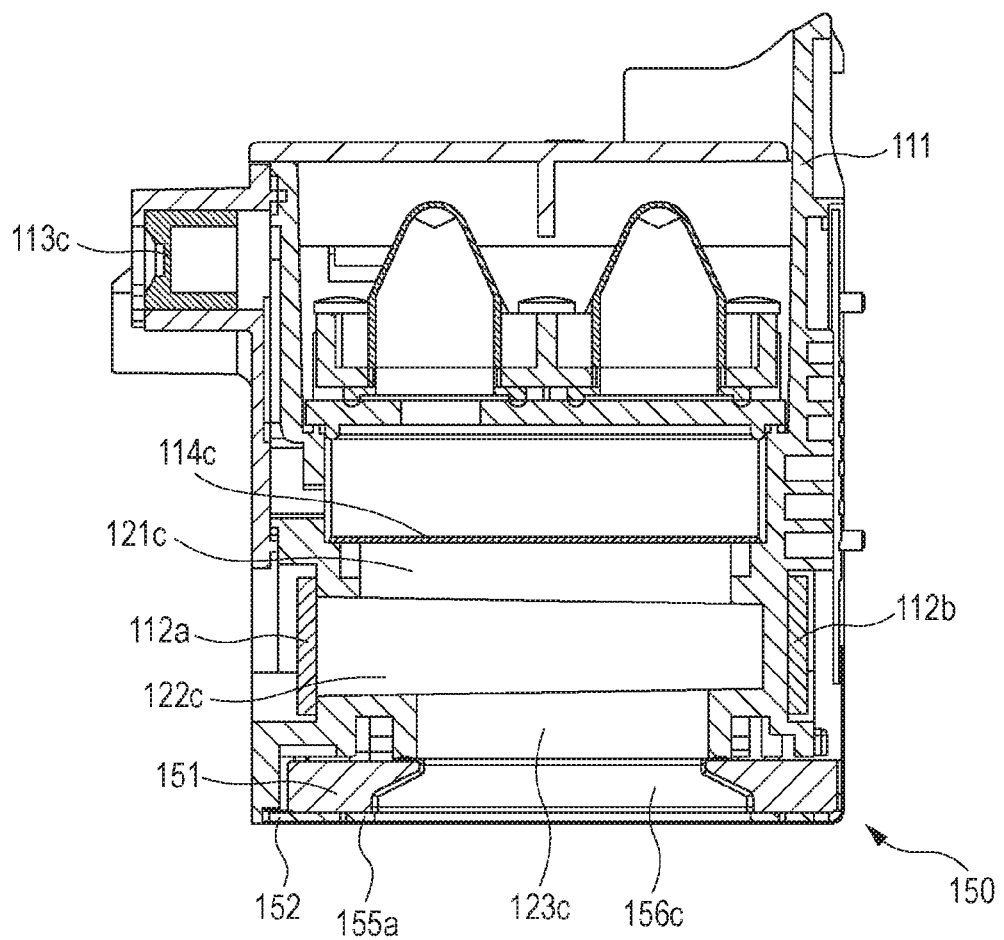
FIG. 4 is a cross-sectional view of the liquid ejection head in the first embodiment of the present invention.

FIG. 4 is a cross-sectional view along line IV-IV of FIG. 2 illustrating an ink supply path from the liquid connector insertion opening 113c to the recording element unit 150. A lid member 112a is not illustrated in FIG. 2, but is illustrated in FIG. 4. Hereinafter, first liquid chambers 121a to 121f may be collectively referred to as a first liquid chamber 121, second liquid chambers 122a to 122f may be collectively referred to as a second liquid chamber 122, and third liquid chambers 123a to 123f may be collectively referred to as a third liquid chamber 123. The ink supplied from the liquid connector insertion opening 113c is made to pass through a filter 114c which prevents entering of a foreign substance into a recording element board 155a, and is supplied to the recording element unit 150 through the first liquid chamber 121c, the second liquid chamber 122c, and the third liquid chamber 123c. The ink supplied to the recording element unit 150 is ejected from ejection ports (not illustrated) provided in the recording element unit 150. The second liquid chamber 122c is constituted by a housing 111 and the lid member 112a as illustrated in FIG. 4. The second liquid chamber 122c extends in a cross direction C which crosses a scanning direction S of the liquid ejection head. The filter 114c defines a part of a boundary of the first liquid chamber 121c, and communicates with the second liquid chamber 122c and the third liquid chamber 123c. The filter 114c extends in the cross direction C. The cross direction C usually crosses the scanning direction S of the liquid ejection head perpendicularly, but may cross the scanning direction S obliquely. In the present embodiment, the scanning direction S coincides with the width direction of the second liquid chamber and a second mold piece. The cross direction C coincides with the direction in which the widths of the second liquid chamber and the second mold piece in the scanning direction S increases or decreases. The later-described housing 111 and a lid member 112 are formed by molded products.

The recording element unit 150 is constituted by two recording element boards 155a and 155b (which may be collectively referred to as a printing element board 155), a first support member 151, a second support member 152, an electric wiring member (an electrical wring tape) 153, and an electric contact board 154. The printing element board 155 of the recording element unit 150 is provided with a substrate made of silicon of thickness 0.5 to 1 mm (hereafter, "silicon substrate") and an energy generating element provided on one side of the silicon substrate and generating energy for the ejection of the liquid. In the present embodiment, a plurality of heating resistance elements (heaters) are used as the energy generating element, and electrical wiring for supplying electric power to each heating resistance element is formed on the silicon substrate by film formation. In the silicon substrate, a plurality of ink channels corresponding to the heating resistance elements and a plurality of ejection ports for ejecting the ink are formed by photolithography. Ink supply ports for supplying the ink to a plurality of ink channels are formed to open on the back side of the silicon substrate.

The printing element board 155 is fixed, by an adhesive, to the first support member 151 provided with the ink supply ports 156a to 156f. The first support member 151 is provided with six ink supply ports 156a to 156f, and is connected to each of the third liquid chambers 123a to 123f. The second support member 152 having an opening is fixed, by an adhesive, to the first support member 151. The electric wiring member 153 is electrically connected to the printing element board 155 via the second support member 152. The electric wiring member 153 applies electrical signals to the printing element board 155 for ejecting the ink. An electric connection portion of the printing element board 155 and the electric wiring member 153 is sealed with a sealing agent and is protected from corrosion caused by the ink and an external shock. The electric contact board 154 is electrically connected to an end of the electric wiring member 153 by thermocompression using anisotropy conductive film (not illustrated). The electric contact board 154 has an external signal input terminal for receiving electrical signals from the liquid ejection apparatus.

Figure 5:
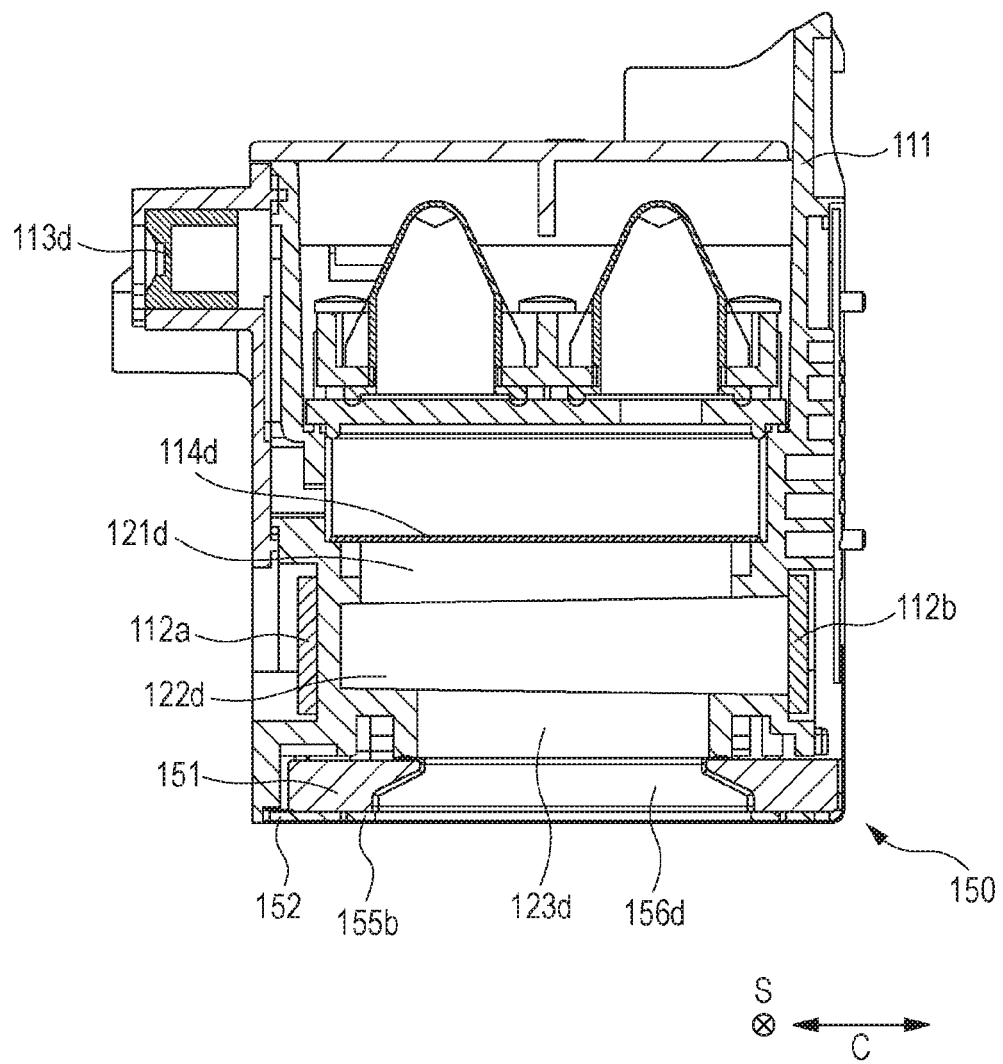
FIG. 5 is a cross-sectional view of the liquid ejection head in the first embodiment of the present invention.

FIG. 5 is a cross-sectional view along line V-V of FIG. 2 illustrating an ink supply path from a liquid connector insertion opening 113d to the recording element unit 150 similar to that illustrated in FIG. 4. The ink supplied from the liquid connector insertion opening 113d is supplied to the recording element unit 150 in the same manner as that illustrated in FIG. 4, but the second liquid chamber 122d differs from the second liquid chamber 122c in structure. The second liquid chamber 122c illustrated in FIG. 4 is constituted by the housing 111 and the lid member 112a as described above, while the second liquid chamber 122d illustrated in FIG. 5 is constituted by the housing 111 and the lid member 112b. As illustrated in FIGS. 2 and 3, the openings of the second liquid chambers 122a, 122c, and 122e are closed by the lid member 112a, while the openings of the second liquid chambers 122b, 122d, and 122f are closed by the lid member 112b. As illustrated in FIGS. 4 and 5, a boundary between the second liquid chamber 122c and the first liquid chamber 121c, and a boundary between the second liquid chamber 122d and the first liquid chamber 121d are slopes, i.e., drafts, of different slope directions. Slopes of boundaries between the second liquid chamber 122 and the third liquid chamber 123 are the same as described above.

Figure 6:
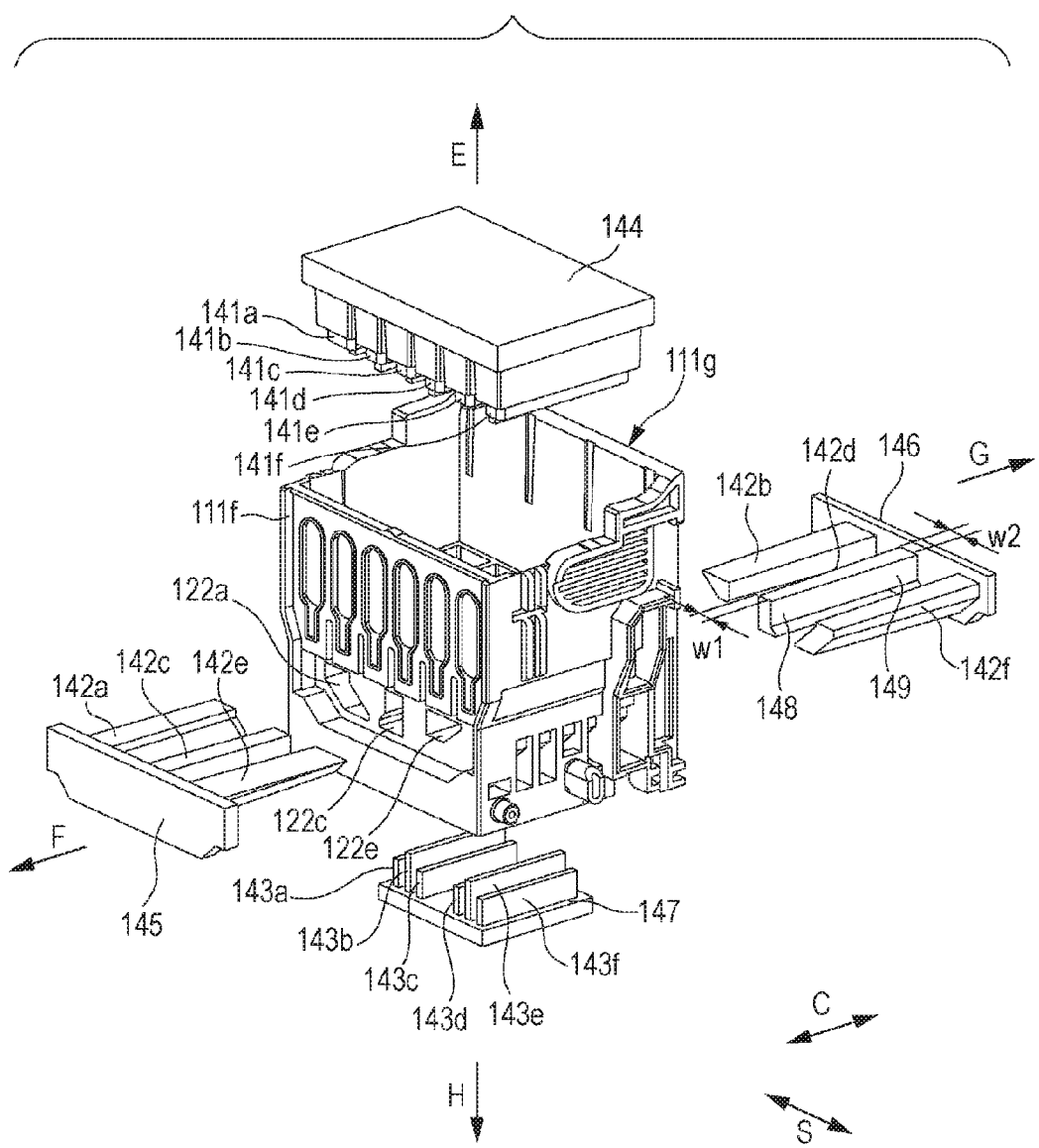
FIG. 6 is a perspective view illustrating arrangement of mold pieces in the first embodiment of the present invention.

Next, a method for manufacturing the first liquid chamber 121, the second liquid chamber 122, and the third liquid chamber 123 formed in the housing 111 is described. The manufacturing method in the present embodiment is an injection molding method in which resin is injected inside a mold for the molding. FIG. 6 is a perspective view illustrating a state where resin has been injected inside the mold (in the periphery of the mold pieces) and then mold pieces have been drawn in a manufacturing process of the housing 111 which is a molding member. In the following description, first mold pieces 141a to 141f may be collectively referred to as a first mold piece 141, second mold pieces 142a to 142f may be collectively referred to as a second mold piece 142, and third mold pieces 143a to 143f may be collectively referred to as a third mold piece 143. The first liquid chambers 121a to 121f are molded using the first mold pieces 141a to 141f, respectively. The first mold pieces 141a to 141f are integrated by a mold piece 144, and are drawn in the direction E illustrated in FIG. 6. The third liquid chambers 123a to 123f are molded using the third mold pieces 143a to 143f, respectively. In the similar manner as the first mold pieces, the third mold pieces 143a to 143f are integrated by a mold piece 147, and are drawn in the direction H illustrated in FIG. 6.

Regarding the second liquid chamber 122, the liquid chambers 122a, 122c, and 122e are molded using the second mold pieces 142a, 142c, and 142e (one of the mold pieces), respectively. These three second mold pieces 142a, 142c, and 142e are integrated by a mold piece 145, and are drawn in the direction F (a first direction) illustrated in FIG. 6. The second liquid chambers 122b, 122d, and 122f are molded using the second mold pieces 142b, 142d, and 142f (the other pieces), respectively. These three second mold pieces 142b, 142d and 142f are integrated by a piece 146, and are drawn in the direction G (a second direction) illustrated in FIG. 6. The directions F and G are parallel to the cross direction C, and are substantially opposite to each other with respect to the cross direction C. The directions E and H cross the directions F and G. The directions E and H are mutually different directions. Specifically, the directions E and H are parallel to the direction which crosses perpendicularly the scanning direction S and cross direction C, and are substantially opposite to each other with respect to the direction which crosses perpendicularly the scanning direction S and the cross direction C. As illustrated in FIG. 6, mold pieces for molding the second liquid chamber 122 are configured alternately by the mold piece 145 and the mold piece 146 with respect to the scanning direction S, and adjoining pieces are drawn in the substantially opposite directions with respect to the cross direction C.

Each of all the pieces 141, 142, and 143 has a draft (i.e., a shape of which width or cross-section decreases gradually in the direction opposite to the direction in which the pieces are drawn) to enhance releasability during molding. The mold piece is different in thickness at an end portion and at a base portion in the direction in which the width thereof decreases the end portion is thin and the base portion is thick. For example, the width of the second mold piece 142d in the scanning direction S decreases gradually toward the end portion 148 from the base portion 149, and the width w2 of the base portion 149 of the second mold piece 142d in the scanning direction S is greater than the width w1 of the end portion 148 in the scanning direction S. Other second mold pieces 142a to 142c, 142e, and 142f are in the same relationship with the second mold piece 142d different in shape but the same in mold piece length and draft. The second mold pieces 142a to 142f are elongated in the direction in which they are drawn (the cross direction C), the difference in width (w2−w1) is especially large. The piece 142 has a draft also in the direction which crosses perpendicularly the scanning direction S and the cross direction C. The mold pieces 141 and 143 also have similar drafts.

A procedure for producing the housing 111 is as follows. First, mold pieces 141, 142, and 143 corresponding to the first liquid chamber 121, the second liquid chamber 122, and the third liquid chamber 123 are arranged, respectively. The second mold pieces 142a, 142c, and 142e for molding the second liquid chambers 122a, 122c, and 122e, and the second mold pieces 142b, 142d, and 142f for molding the second liquid chambers 122b, 122d, and 122f are arranged in the opposite directions with respect to the cross direction C. That is, the second mold pieces 142a, 142c, and 142e and the second mold pieces 142b, 142d, and 142f are arranged so that their widths decrease in the opposite directions. These second mold pieces 142 are arranged adjoining each other in the scanning direction S. After the mold pieces 141, 142, and 143 are arranged, resin is injected into the mold to form the housing 111 by molding. The mold pieces 141, 142, and 143 are drawn from the thus molded housing 111 at their base portions. The second mold pieces 142 are drawn in the direction in which their widths in the scanning direction S increase. In this manner, openings 124a to 124f of the end portions of the liquid chambers with greater widths in the scanning direction S are formed on wall surfaces 111f and 111g on the opposite sides of the housing 111 with respect to the cross direction C. Then, the openings 124a to 124f at the end portions are covered by the lid members 112a and 112b. The mold pieces 141, 142, and 143 may be drawn substantially simultaneously or may be drawn separately.

Figure 7:
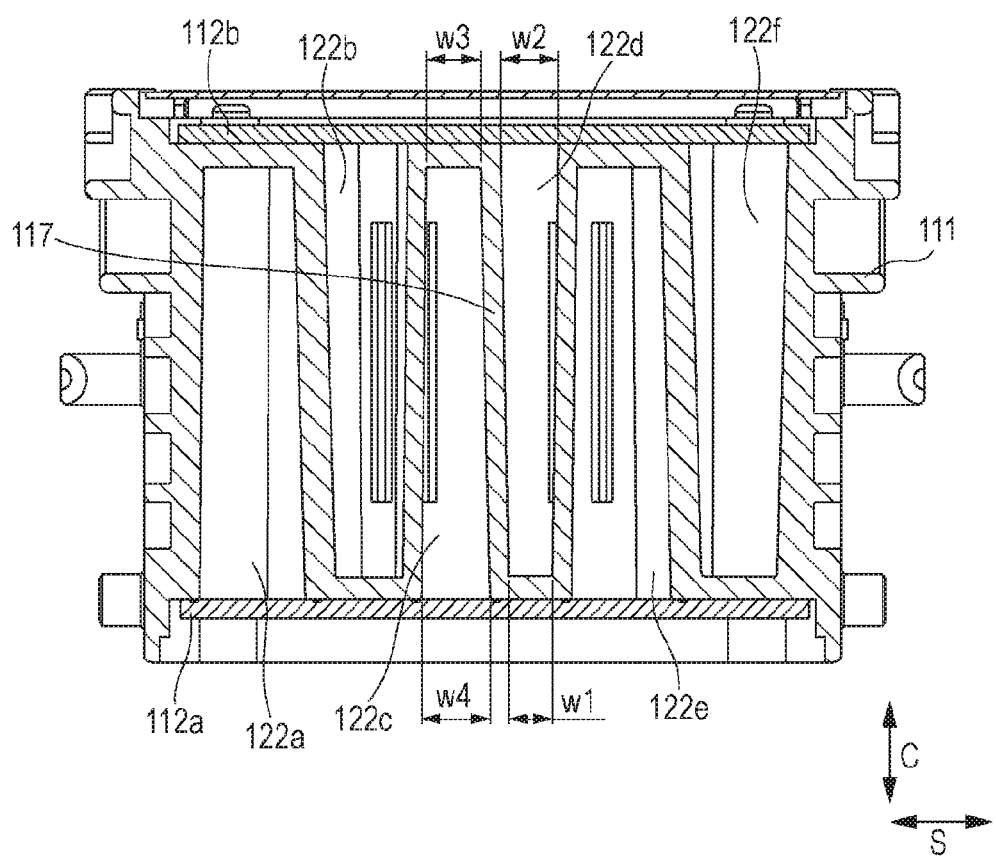
FIG. 7 is a cross-sectional view of the liquid ejection head in the first embodiment of the present invention.

FIG. 7 is a cross-sectional view along line VII-VII of FIG. 2, illustrating the second liquid chambers 122a to 122f arranged adjoining each other. In the second liquid chamber 122d, the side on which the lid member 112b is provided is the base portion of the mold piece 142d. Therefore, the width w2 of the second liquid chamber 122d on the side of the opening on the side of the lid member 112b) is greater than the width w1 on the side of the end portion, and the width of the second liquid chamber 122d in the scanning direction S becomes gradually narrower in the cross direction C. Also in the second liquid chamber 122c, the width w4 of the base portion is greater than the width w3 of the end portion, and the width in the scanning direction S becomes gradually narrower in the cross direction C. However, since the second mold piece 142c adjoins the second mold piece 142d with respect to the scanning direction S, the base portions are located on opposite sides with respect to the cross direction, and the end portions are located on opposite sides with respect to the cross direction. That is, a pair of second liquid chambers 122c and 122d adjoining in the scanning direction S are disposed with the directions in which their widths decrease facing opposite directions. Since the second liquid chamber 122c and the second liquid chamber 122d are the same in draft as described above, as illustrated in FIG. 7, side surfaces of a partition wall 117 disposed between the second liquid chamber 122c and the second liquid chamber 122d are parallel with each other, and the thickness of the partition wall 117, i.e., the width of the partition wall 117 in the scanning direction S, is constant in the cross direction C. As illustrated in FIG. 7, the thickness in the scanning direction S of other partition walls formed by the second liquid chambers is also constant in the cross direction C.

With the configuration and manufacturing method described above, problems like sink and short circuit caused by uneven thickness of the partition walls in the cross direction C during molding can be prevented. In the present embodiment, regarding the second mold pieces 142 of which mold piece length, i.e., drawing length of the mold piece, is the longest, adjoining mold pieces are disposed to face opposite directions. Therefore, more significant effect can be obtained.

Second Embodiment

Figure 8:
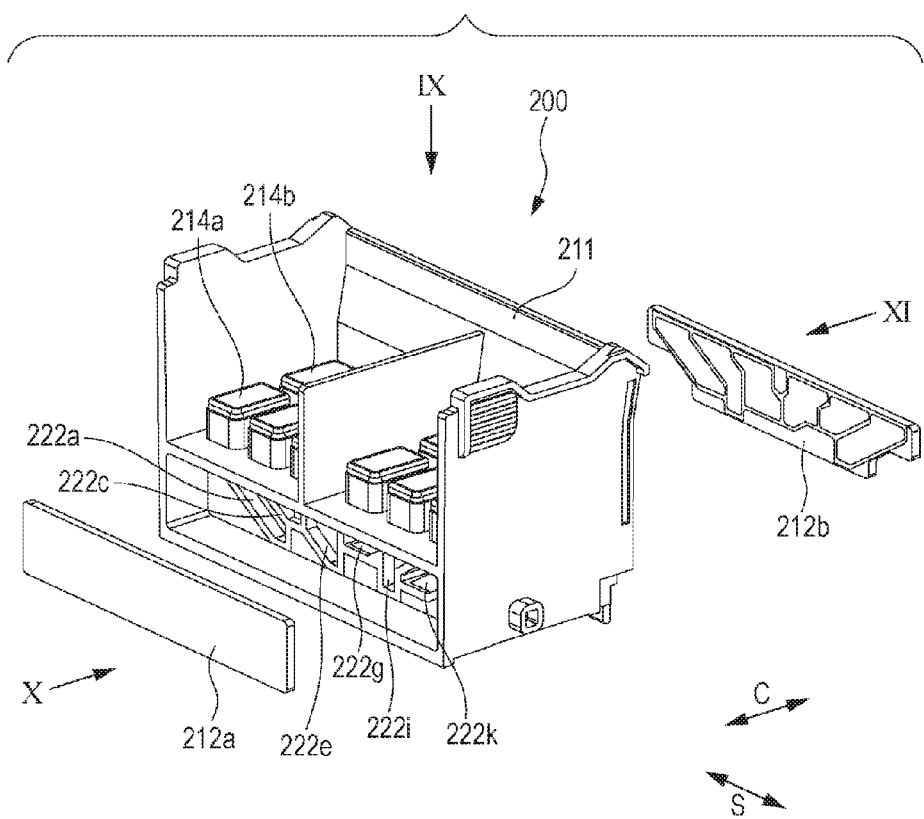
FIG. 8 is an exploded perspective view of a liquid ejection head in a second embodiment of the present invention.
Figure 9:
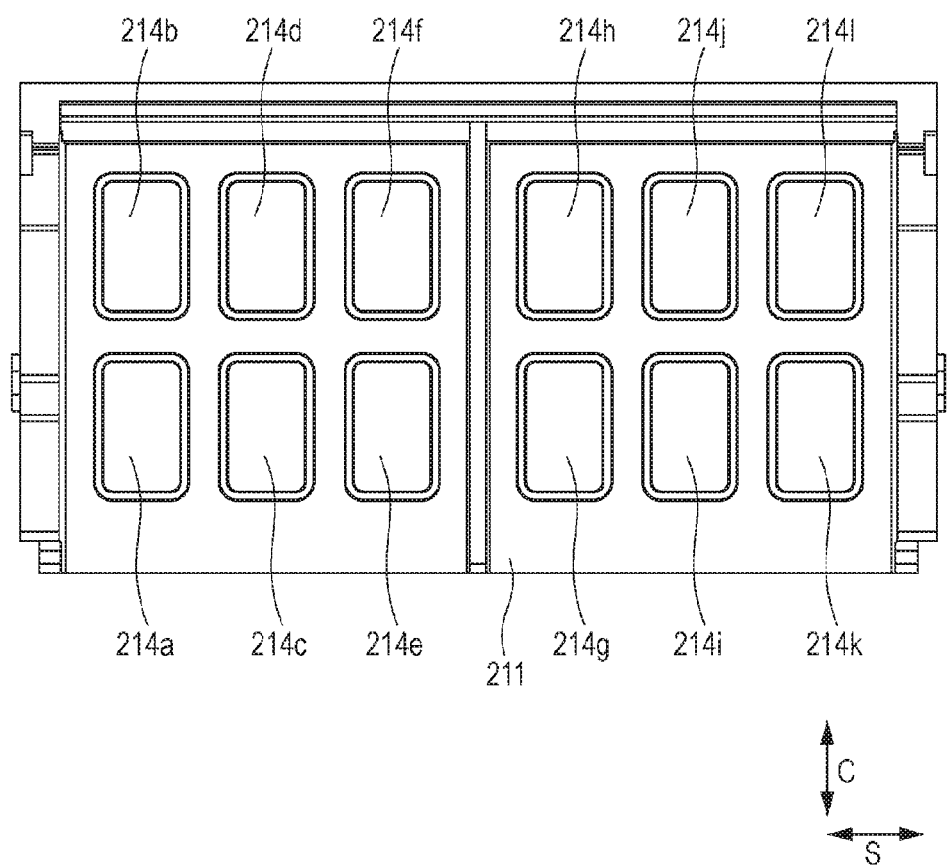
FIG. 9 is a plan view of the liquid ejection head in the second embodiment of the present invention.
Figure 10:
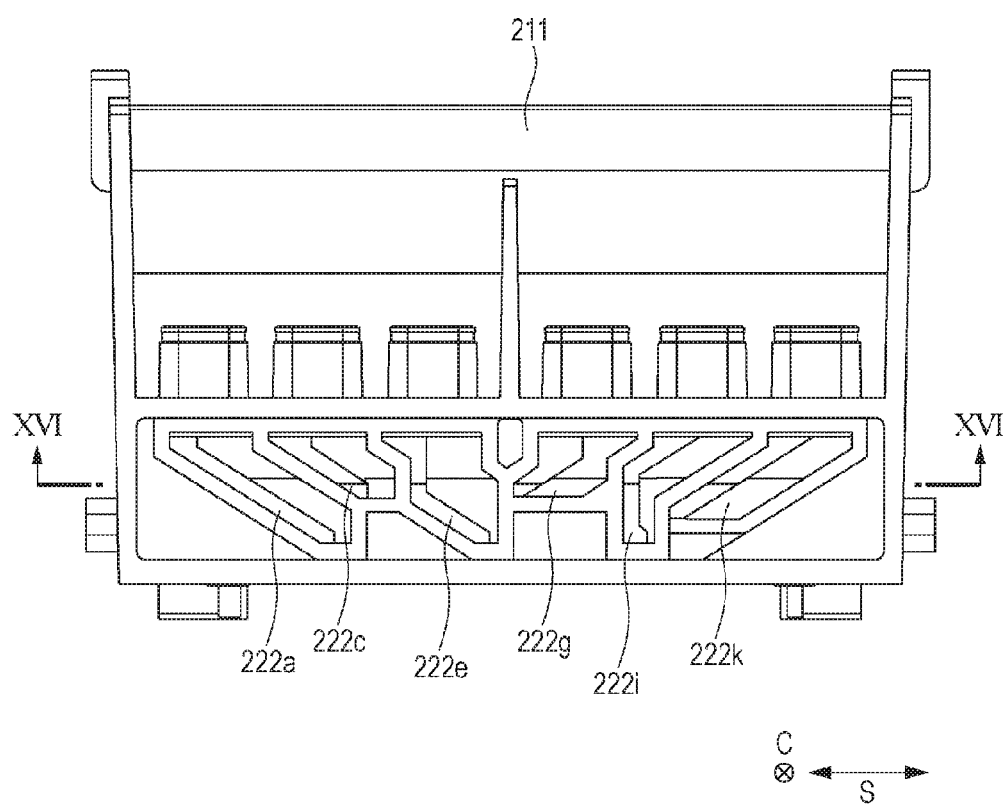
FIG. 10 is a plan view of the liquid ejection head in the second embodiment of the present invention.
Figure 11:
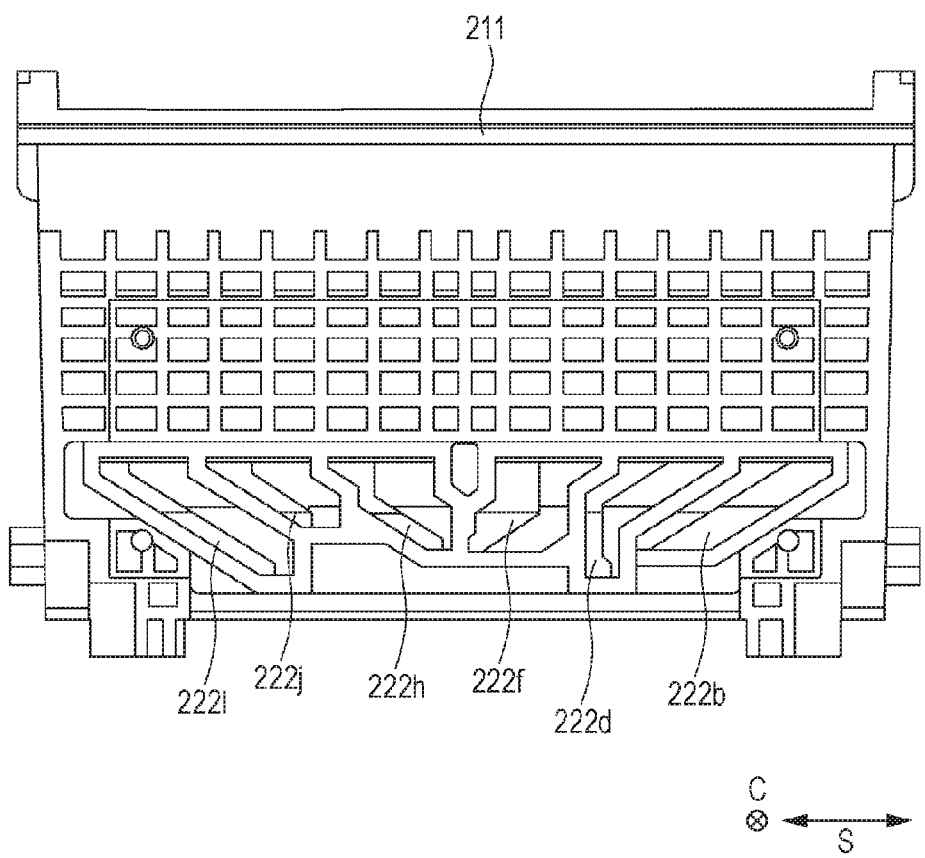
FIG. 11 is a plan view of the liquid ejection head in the second embodiment of the present invention.

In the second embodiment, a configuration and a manufacturing method different from those of the first embodiment are described, and other description is omitted. FIG. 8 is an exploded perspective view illustrating a liquid ejection head 200 of the second embodiment. FIG. 9 is a plan view of the liquid ejection head 200 when seen a housing 211 from the direction of arrow IX in FIG. 8. FIG. 10 is a plan view of the liquid ejection head 200 seen from the direction of arrow X in FIG. 8. FIG. 11 is a plan view of the liquid ejection head 200 seen from the arrow XI in FIG. 8.

The liquid ejection head 200 of the second embodiment is capable of supplying 12 types of ink independently. As illustrated in FIG. 9, filters 214a to 214l are arranged in two vertical rows (a cross direction C) each consisting of six filters in the horizontal direction (a scanning direction S).

Figure 12:
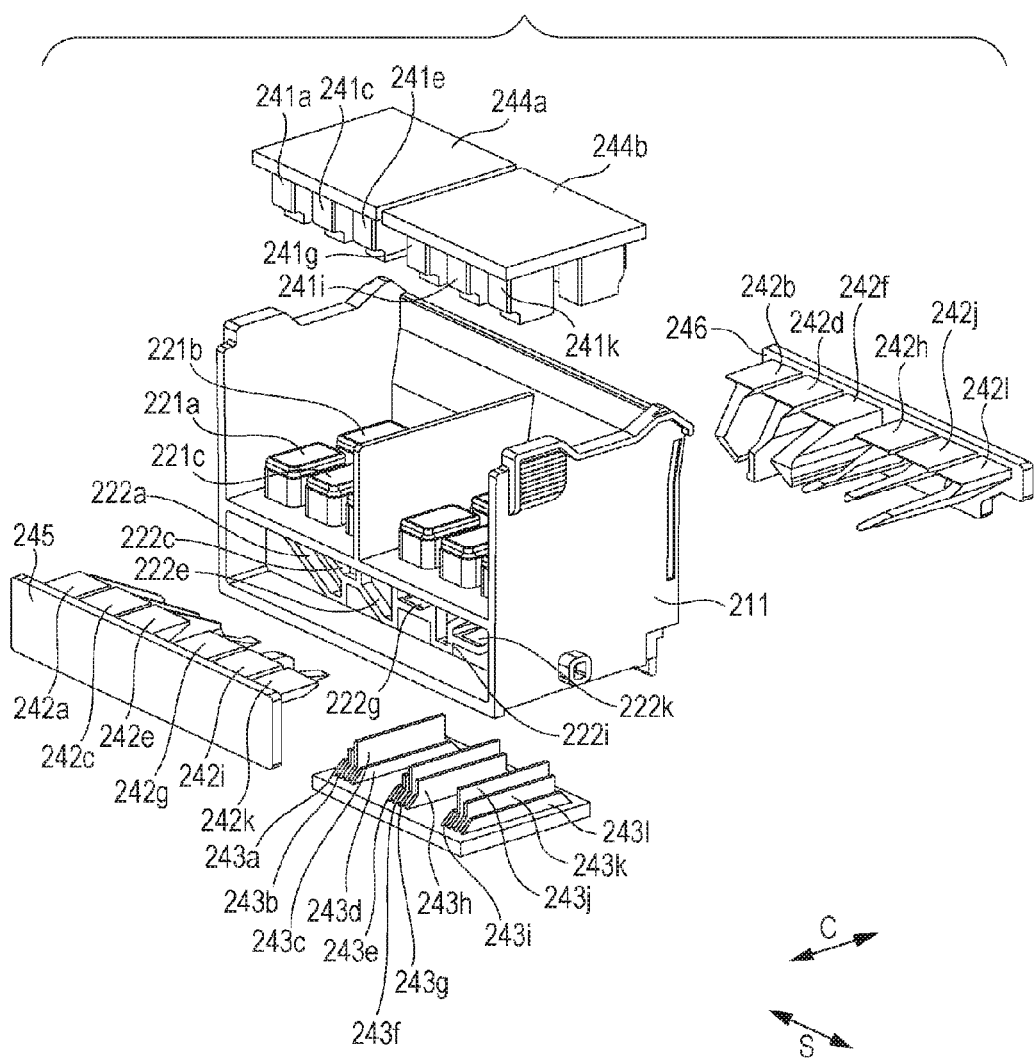
FIG. 12 is a perspective view illustrating arrangement of mold pieces in the second embodiment of the present invention.
Figure 13:
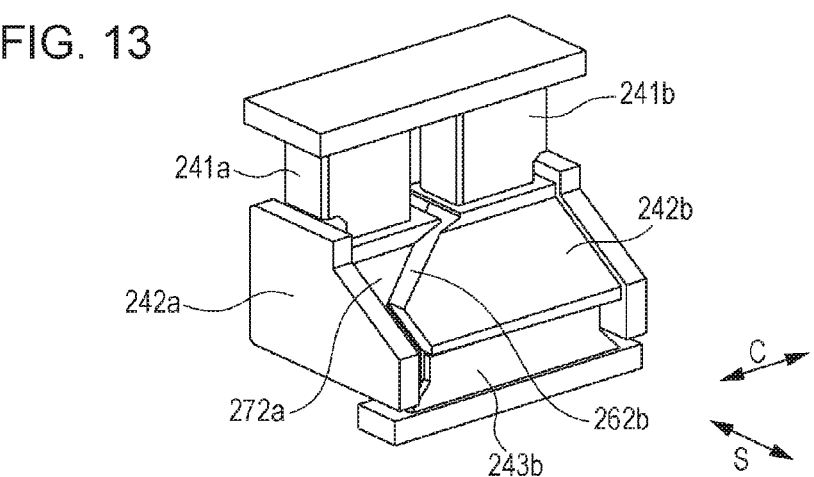
FIG. 13 is a detailed perspective view illustrating arrangement of mold pieces in the second embodiment of the present invention.
Figure 14:
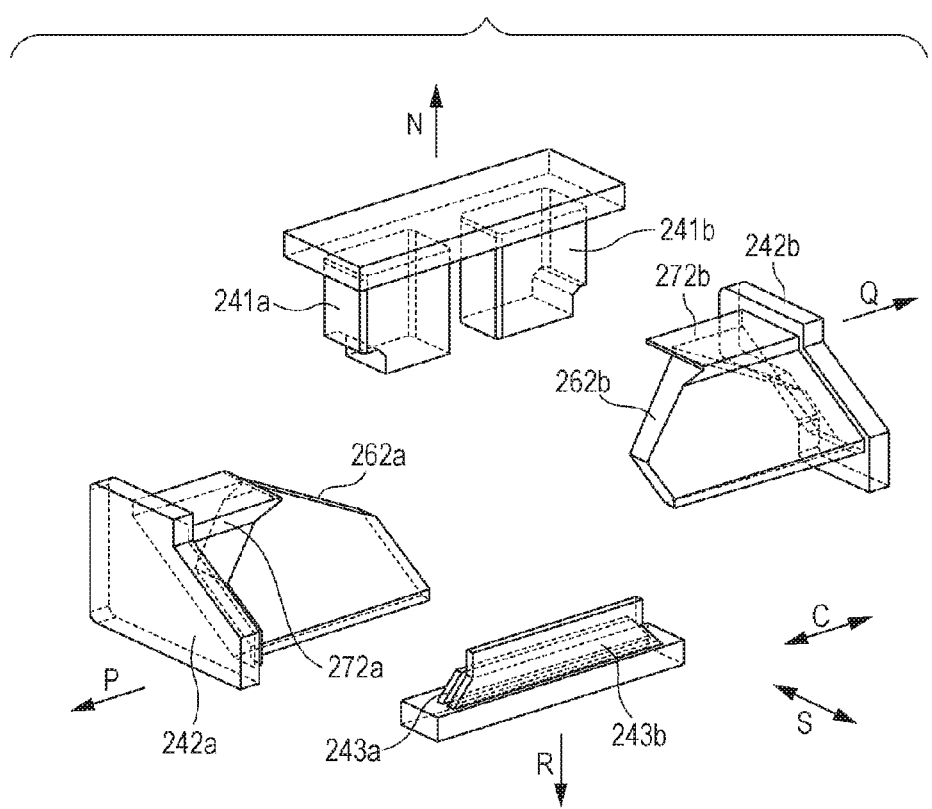
FIG. 14 is a detailed perspective view illustrating arrangement of mold pieces in the second embodiment of the present invention.
Figure 15:
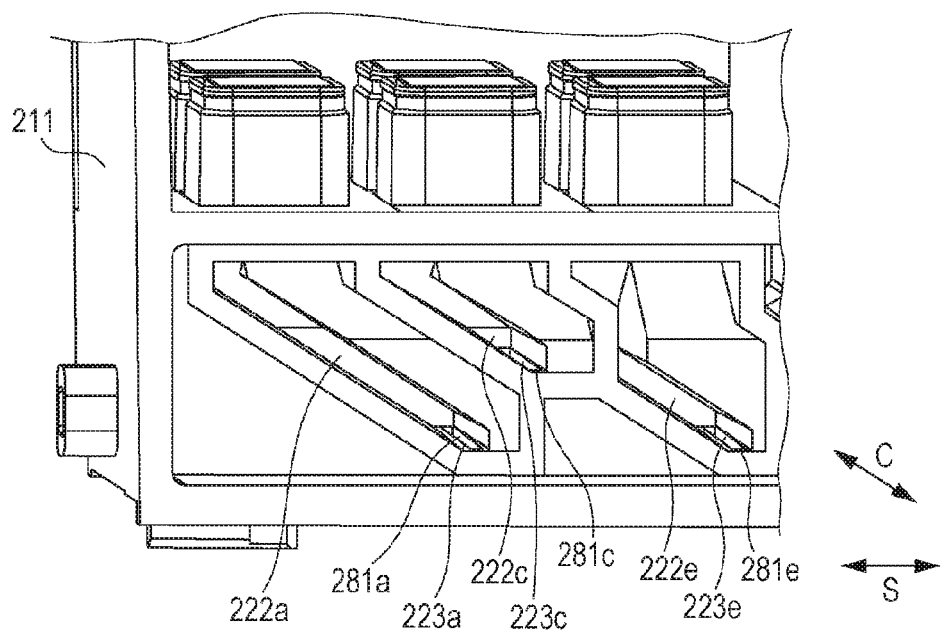
FIG. 15 is a fragmentary perspective view of the liquid ejection head in the second embodiment of the present invention.

FIG. 12 is a perspective view illustrating a state where the mold pieces have been drawn in the manufacturing process of the housing 211 which is a molded product. FIG. 13 is a perspective view illustrating arrangement, during molding, of the mold pieces for molding the first liquid chamber, the second liquid chamber, and the third liquid chamber corresponding to the filters 214a and 214b. FIG. 14 is a perspective view illustrating the state where the mold pieces illustrated in FIG. 13 are drawn. FIG. 15 is a detailed perspective view illustrating the second liquid chambers 222a, 222c, and 222e and the third liquid chambers 223a, 223c, and 223e. Here, a pair of adjoining first, second, and third liquid chambers are described in the same manner as in the first embodiment. Configurations and manufacturing methods of the liquid chambers are the same as those of the described example.

First liquid chambers 221a and 221b are molded using first mold pieces 241a and 241b, and are drawn in the direction N of FIG. 14. Third liquid chambers 223a and 223b are molded using third mold pieces 243a and 243b, and are drawn in the direction R of FIG. 14. A second liquid chamber 222a is molded using a second mold piece 242a, and is drawn in the direction P of FIG. 14. A second liquid chamber 222b is molded using a second mold piece 242b and is drawn in the direction Q of FIG. 14. As illustrated in FIG. 14, the second mold pieces 242a and 242b are drawn in the opposite directions. The first liquid chambers 221a and 221b extend in the direction parallel to the direction in which the second mold pieces 242a and 242b are drawn. Each of the first mold piece 241, the second mold piece 242, and the third mold piece 243 has a draft for enhancing releasability during molding. The mold piece is different in thickness at the end portion and the base portion: the end portion is thin and the base portion is thick. Slopes 262a and 262b are formed at end portions of the second mold piece 242a and 242b by cutting the end off. Wide portions 272a and 272b are provided at the base end. As illustrated in FIG. 13, the wide portion 272a is disposed to be located in a space formed by the slope 262b when the mold pieces are brought in contact with each other during molding. That is, the wide portion 272a of the second mold piece 242a overlaps, in the scanning direction S, the slope 262b of the second mold piece 242b adjoining the second mold piece 242a in the scanning direction S. Similarly, the wide portion 272b is disposed at a position corresponding to the slope 262a.

Figure 16:
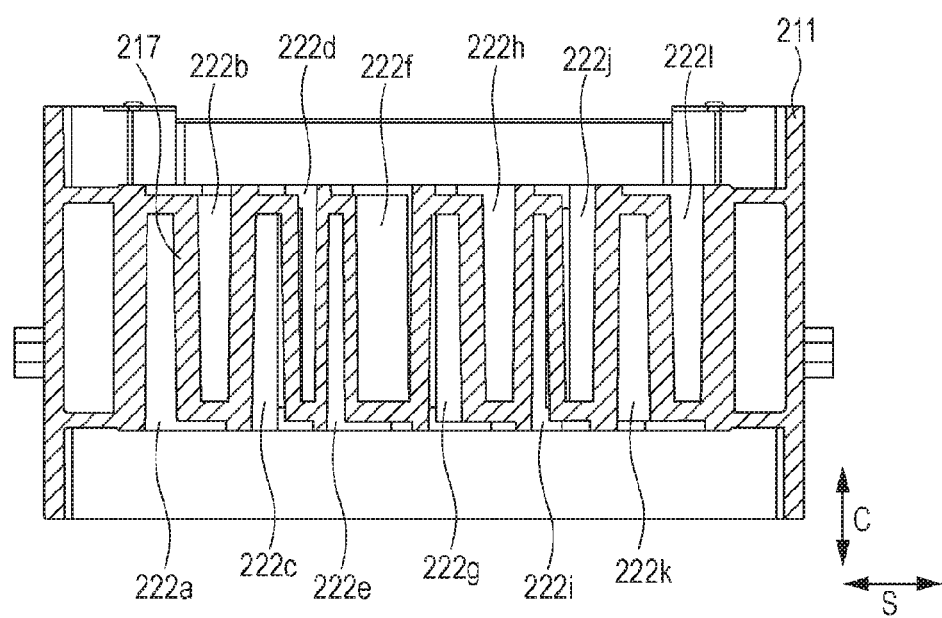
FIG. 16 is a cross-sectional view of the liquid ejection head in the second embodiment of the present invention.

FIG. 16 is a cross-sectional view along line XVI-XVI of FIG. 10. Since the second mold pieces 242a and 242b are drawn in the opposite directions, a partition wall 217 of a housing 211 formed by the second liquid chambers 222a and 222b has a constant thickness in the cross direction C. Other partition walls are the same as described above. In FIG. 16, the partition walls are illustrated to have different thickness because the partition walls are cut along line XVI-XVI at different locations thereof and are illustrated at different angles: all the partition walls have the same thickness.

With the configuration and manufacturing method described above, problems like sink and short circuit caused by uneven thickness of the partition walls in the cross direction C during molding can be prevented. In the present embodiment, regarding the second mold piece 242 of which mold piece length, i.e., drawing length of the mold piece, is the longest, adjoining mold pieces are disposed to face opposite directions. Therefore, more significant effect can be obtained.

To improve color reproducibility and to improve recording quality in a serial scanning liquid ejection apparatus, an increase in types of ink to be mounted (hereafter, "multi-colorization") is effective. In a configuration in which the liquid chambers are arranged adjoining one another in the scanning direction S, an outer width of the liquid ejection head in the scanning direction S increases as a result of multi-colorization. As the outer width of the liquid ejection head in the scanning direction S increases, the width of the liquid ejection apparatus in the scanning direction S also increases. To decrease the width of the liquid ejection head in the scanning direction S, decreasing the width of the liquid chamber in the scanning direction S is effective. When the thickness of the mold piece is small and the mold piece is elongated in the drawing direction, strength of the mold piece is generally low. Therefore, the mold piece is shaken by pressure of resin during molding and resin easily enters an engaging portion of the mold pieces. As a result, an engagement condition of the mold pieces easily becomes unstable. If the engagement condition of the mold pieces becomes unstable, a burr is easily produced at the engaging portion of the mold pieces. Burrs are easily produced at, for example, edge portions 281a, 281c, and 281e, which are boundaries of the second liquid chamber and the third liquid chamber in FIG. 15. The burr may cause a supply failure of ink due to reduction in a cross-sectional area of the liquid chamber, prevention of movement, toward the filter, of air bubbles generated during recording, clogging of the ejection ports by burrs separated during recording, and the like, and may adversely affect the supply of the ink.

In the present embodiment, however, the wide portion 272 is provided at the base portion while reducing the body product of the mold piece by forming the slope by cutting the end portion off especially in the second mold piece 242 which is elongated in the drawing direction. Therefore, mold piece intensity can be improved, proof stress to resin pressure during molding can be improved, and production of burr can be reduced. As a result, the influences on the ink supply described above can be reduced.

A serial scanning liquid ejection head has been described in each embodiment, but the present invention is not limited to the same. The present invention is applicable also to a full line liquid ejection head provided with an ejection port array of a length corresponding to a width of a recording medium.

According to the present invention, a method for manufacturing a liquid ejection head and a liquid ejection head capable of reducing variation in thickness of a partition wall between liquid chambers can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-059442, filed Mar. 23, 2015, which is hereby incorporated by reference herein in its entirety.

What is claimed is:

1. A method for manufacturing a liquid ejection head provided with a housing which includes adjoining a first and a second liquid chambers for holding a liquid to be supplied to a printing element board which has an energy generating element generating energy for ejecting the liquid, the method comprising:

arranging one mold piece for molding the first liquid chamber and another mold piece for molding the second liquid chamber adjoining each other;

injecting resin around the one mold piece and the another mold piece to mold the first and the second liquid chambers;

filtering, by a filter communicating with the first and the second liquid chamber, the resin before injecting the resin around the one mold piece and the another mold piece, wherein the filter extends in a direction in which the width of the one mold piece and the another mold piece decreases;

drawing the one mold piece from the first liquid chamber in a first direction; and drawing the another mold piece from the second liquid chamber in a second direction opposite to the first direction.

2. The method for manufacturing a liquid ejection head according to claim 1, wherein a width of the one mold piece at an end portion on the side of the first direction is greater than a width of the one mold piece at an end portion on the side of the second direction.

3. The method for manufacturing a liquid ejection head according to claim 1, wherein a width of the another mold piece at an end portion on the side of the second direction is greater than a width of the another mold piece at an end portion on the side of the first direction.

4. The method for manufacturing a liquid ejection head according to claim 1, wherein the drawing of the one mold piece and the drawing of the another piece are performed simultaneously.

* * * * *